Patented Oct. 18, 1949

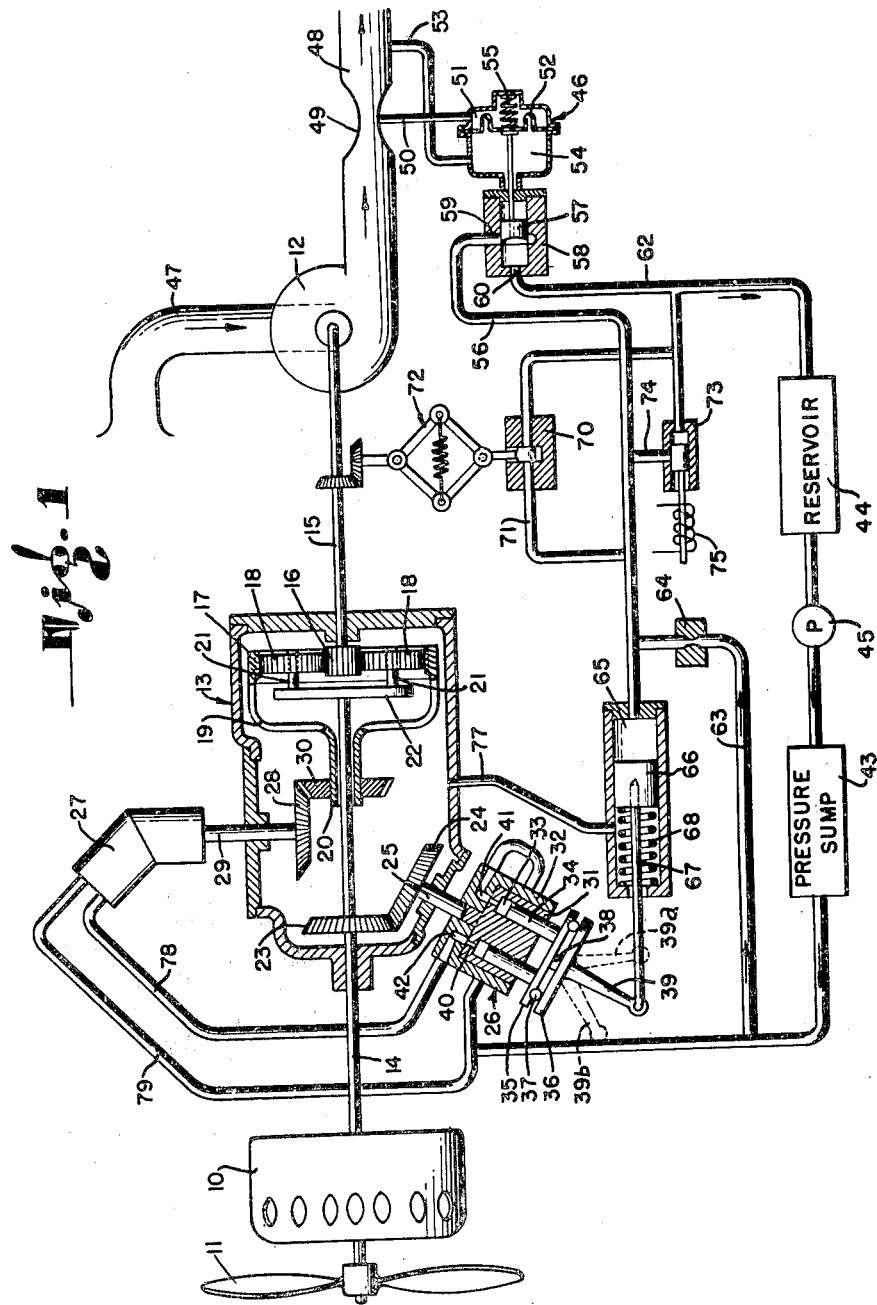

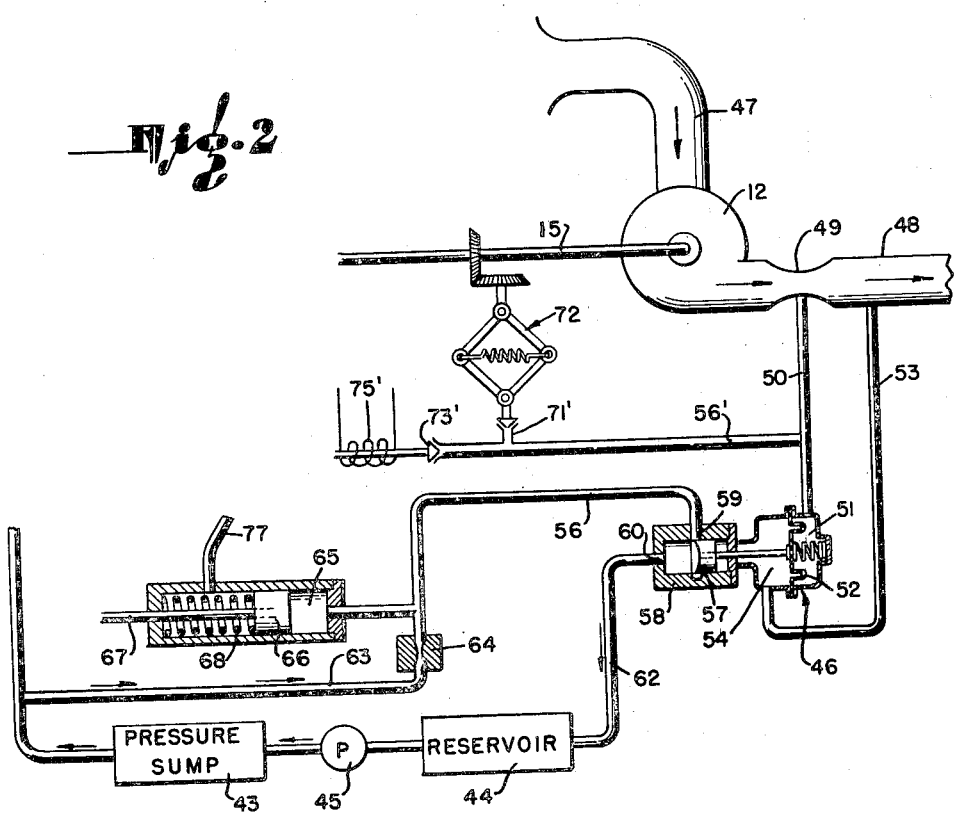

2,485,126

UNITED STATES PATENT OFFICE 2,485,126

HYDRAULICALLY CONTROLLED VARIABLE-SPEED TRANSMISSION

Homer J. Wood, Los Angeles, Calif., assignor to The Garrett Corporation, Los Angeles, Calif., a corporation of California Application January 10, 1947, Serial No. 721,373

14 Claims. (Cl. 230—11)

1

My invention relates to air circulating means for aircraft, and relates in particular to a system for supplying a compartment of an aircraft with air under pressure, this system having a variable speed transmission through which a supercharger is driven at regulated speed from an engine of variable speed.

It is an object of the invention to provide a system for supplying a compartment with air under pressure, wherein power from a variable speed engine is delivered to an air pumping means through a simple hydraulically controlled transmission.

A further object of the invention is to provide in this system a variable speed transmission, wherein a driven gear connected to the air pump is differentially driven by a pair of power transmitting connections which both have operative, power transmitting connection with the power output shaft of the engine.

A further object of the invention is to provide a system of the character described herein having an air pump differentially driven through a pair of power connections operatively connected to the power output shaft of the engine, these power connections being arranged so that there will be no frictional loss of power during the various conditions under which the device is operated. By frictional loss of power, I mean that wastage of power resulting in devices such as disclosed in Patent No. 2,390,487 to Donald M. Lawrence, et al., dated December 4, 1945, wherein the speed of a supercharger is controlled by dissipation of a part of the driving power through a gear type fluid brake.

A further object of the invention is to provide a system of this character having automatic control means whereby the driven member, such as the supercharger, is operated at low speed when the system is first started up from a cold condition or period of inoperation.

A further object of the invention is to provide a system wherein a driven member is operated at controlled speed from an engine of indeterminate or variable speed through use of a divided drive having two paths through which power from the engine flows to the driven member, one of these paths of power flow including a pair of hydraulic engines connected in series, one of these hydraulic engines acting as a pump while the other functions as a fluid driven motor, and one of these hydraulic engines being variable in its function.

A further object of the invention is to provide in a system of the character described a variable speed transmission having a driven gear and first

2 and second gears arranged to differentially drive the driven gear, there being power connections between the engine and the first and second gears for operating the same, at least one of these power connections comprising a pair of hydraulic engines in series, such engines being arranged so that one acts as a pump while the other acts as a fluid driven motor.

Further objects and advantages of the invention will be brought out in the following part of the specification, wherein I have referred to schematic drawings showing preferred embodiments of the invention and wherein detailed explanation is for the purpose of fully disclosing the same, without placing limitation on the invention as set forth in the appended claims.

Referring to the drawings which are for illustrative purposes only:

Fig. 1 is a schematic view of a preferred embodiment of the invention.

Fig. 2 is a fragmentary schematic view showing an alternative form of over speed and manual control.

As shown in Fig. 1 of the drawings, the schematically indicated engine 10 may be employed to drive a propeller 11 at different speeds in accordance with the conditions of flight. For example, during take-off or fast climbing rates, the engine 10 will be operated at high speed; during normal level flight, the engine will be operated at cruising speed; and during descent, the engine 10 will be operated at reduced speed.

For supply of air to a compartment of an aircraft, for example, the passenger cabin, an air pumping means or supercharger 12 is provided. Despite the wide variations in the speed of the engine 10, the speed of the supercharger 12 must be maintained substantially constant, although there will be some variation in speed of this supercharger 12 as the flight altitude of the aircraft changes.

In my present system I provide for driving the supercharger 12 at substantially constant speed from the engine 10 of variable speed, an automatically controlled variable speed transmission 13, having at one end thereof a shaft 14 which receives power from the engine 10 and having at the other end thereof a shaft 15 through which power is transmitted to the supercharger 12 at the speed determined by the control means which will be hereinafter described. For operation of the shaft 15 a driven gear 16 is provided, this gear 16 being differentially driven by gear means 17 and 18 which are disposed in power transmission connection with the engine 10.

The gear means 17 consists of a ring gear which is supported by a yoke or forks 19 extending from a sleeve 20 disposed around the shaft 14. The gear means 18 consists of planetary gears mounted on stub shafts 21 carried by a circular plate 22 which is mounted on the rightward end of the shaft 14. It is characteristic of planetary or differential gearing of the type shown that the speed of the driven gear depends upon the relative speeds of the gears which are in differential driving association therewith. For example, if the ring gear 17 is held stationary, rotation of the plate 22 will cause the planetary gears of the gear means 18 to roll around the ring gear 17, thereby driving the gear 16. If the ring gear 17 is unrestrained and the gear 16 is restrained, rotation of the plate 22 will result in rotation of the ring gear 17 around the gear 16 which will remain stationary. By varying the relative rates of rotation of the parts 17 and 22, it is possible to vary the speed of the shaft 15 or to maintain the speed of the shaft 15 constant.

Between the differential gear means 17 and 18 and the engine 10, there are two separate drive connections, at least one of these drive connections being of variable speed and associated with control means whereby the speed of the shaft 15 which drives the supercharger 12 may be controlled. The drive connection to the gear means 18 is directly through the shaft 14 to the plate 22. The drive connection to the ring gear 17 is through a gear 23 fixed on the shaft 14 and arranged to mesh with a gear 24 which is fixed on the shaft 25 of a hydraulic engine 26, a hydraulic engine 27 in series connection with the hydraulic engine 26 through ducts 78 and 79, and power transmitting means between the engine 27 and the sleeve 20, consisting of a gear 28 mounted on the shaft 29 of the engine 27 and a gear 30 mounted on the sleeve 20. The engines 26 and 27 are of the displacement type, characterized by having operative parts adapted to be driven by fluid under pressure so as to drive a power output shaft or, when power is applied to the shaft, the operative parts will pump fluid through the chambers or fluid spaces of the engine. In the operation of the transmission, either one of the engines 26 or 27 may serve as a pump while the other acts as a fluid driven motor. Also, one of these hydraulic engines 26 or 27 is of variable capacity, so that there may be a variation in the relative speeds of the shafts 25 and 29. In the form of the invention shown, the engine 26 is of variable capacity type. It is schematically shown as having a cylinder body 31 fixed on the shaft 25 so as to be rotated within a shell 32. This cylinder body 31 has around the axis thereof cylinders 33 in which pistons 34 are operative. The outer ends of the pistons 34 engage a plate 35 supported for rotation upon a plate 36 by thrust bearing means 37. The plate 36 is supported for rotation around a transverse axis 38 and is provided with a lever 39 adapted to be swung from the neutral position in which it is shown in full lines into positions 39a and 39b, thereby tilting the plates 36 and 35 in either direction around the transverse axis 38.

The inner ends of the cylinder 33 are connected to ports 40 which in turn connect with nearly semi-circular ports 41 and 42 in the shell 32. When the lever 39 is in neutral position as shown in full lines, the plate 35 will be disposed in a plane perpendicular to the axis of rotation of the cylinder body 31, and therefore rotation of the shaft 25 and the body 31 will produce no axial movement of the pistons 34 in the cylinder bores 33, but when the lever is swung either toward the left or toward the right, the plate 35 will be tilted and rotation of the cylinder body 31 will result in reciprocation of the pistons 34 so as to produce a pumping action. Furthermore, if fluid pressure is applied through either of the substantially semi-circular ports 41 and 42 while the plate 35 is tilted, the fluid pressure applied to a part of the pistons 34 will cause these pistons to react against the tilted plate 35 and cause rotation of the cylinder body 31. The capacity of the hydraulic engine 26, whether it is acting as a pump or as a fluid driven motor, is varied from neutral in either forward or reverse phases by shifting the lever 39 toward either of its positions 39a or 39b. The schematically shown hydraulic engine 27 is of fixed capacity. The hydraulic circuit, including the engines 26 and 27 and the conduits 78 and 79 is fed with hydraulic fluid under pressure, such as oil, for example, from a pressure sump 43 into which oil is delivered from a reservoir 44 by a pump 45.

For control of the variable capacity engine 26, I provide means 46 which is responsive to air in the path of airflow which includes the supercharger 12. This path of airflow, leading to the compartment of the aircraft which is to be supplied with air under pressure, includes an inlet duct 47 leading to the inlet of the supercharger 12 and a delivery duct 48 which connects the outlet of the supercharger 12 with the compartment. In this path of flow I provide a Venturi throat 49 which is connected through a duct 50 with a chamber 51 formed on one side of a movable wall shown as a diaphragm 52. A duct 53 connects the path of flow to the chamber 54 lying on the opposite side of the diaphragm 52.

The diaphragm, urged leftwardly by a spring 55, provides a means for controlling the escape of fluid pressure from a duct 56. For this purpose, the diaphragm 52 is connected to a movable valve part 57 of a valve 58 having an inlet port 59 to which the duct 56 is connected, and having an outlet port 60 connected through piping 62 with the oil reservoir 44.

The duct 56 is constantly fed with fluid under pressure from the pressure sump 43 through piping 63 and an orifice 64. The duct 56 is connected to the rightward end of a cylinder 65 in which a piston 66 is operative, this piston 66 being connected by a piston rod 67 with the lever 39, and being urged rightwardly by a spring 68. A fluid drain line 77 connects the leftward end of the cylinder 65 with the gear case of the transmission 13.

The fluid pressure in the duct 56 and in the cylinder 65 is determined by the control of the escape of fluid from the duct 56 by the movable valve part 57. This control of the pressure in the duct 56, and, likewise, control of the position of the piston 66, is the function of the diaphragm 52 which acts in response to air moving through the path of flow which includes the supercharger 12. Other means for reducing the fluid pressure in the duct 56 are provided by a valve 70 disposed in piping 71 leading from the duct 56 to the fluid return piping 62. This valve 70 is operated by the schematically shown governor 72, driven from the shaft 15 of the supercharger 12, when a predetermined maximum speed of the shaft 15 is reached, to release pressure from the duct 56 and the cylinder 65 to accomplish a readjustment of the transmission 13 which will avoid over speed driving of the shaft 15. An auxiliary, or manual, control for reducing the pressure in the duct 56 is provided by a valve 73 disposed in piping 74 which connects the duct 56 to the return piping 62. The valve 73 has a solenoid 75 which, when energized, will open the valve 73 and thereby bleed fluid pressure from the duct 56.

In describing the operation of the system, it may be now explained that in the drawing, the position of the valve 57 is such that the pressure in the duct 56 is maintained at such value as to force the piston 66 to a position wherein the lever 39 of the variable capacity hydraulic engine 26 is in neutral position. At this time the plate 35 is held in a plane perpendicular to the axis of rotation of the cylinder body 31 so that there is no flow through the ducts 78 and 79. Since no flow of fluid is permitted through the ducts 78 and 79, the hydraulic engine 27 can not operate. Accordingly, the shaft 29 is held stationary and the ring gear 17 is prevented from rotation and the driving of the shaft 15 is accomplished solely from the rolling of the planetary gears of the gear means 18 around the interior of the ring gear 17. Should there, at this time, be a reduction in engine speed, the slowing down of the shaft 15 will result in a reduction in the quantity of air pumped by the supercharger 12. This reduction in airflow will be accompanied by a reduction in the pressure differential transmitted through the ducts 50 and 53 to the chambers 51 and 54, causing a slight leftward movement of the diaphragm 52 and a resultant closing movement of the valve part 57 to reduce the escape of fluid from the duct 56. The increase in pressure thereby caused will act in the cylinder 65 to move the piston 66 leftward against the spring 68, thereby moving the lever 39 toward its position 39b, thereby tilting the plate 35 in a direction to cause the hydraulic engine 26 to act as a pump. Acting as a pump, the engine 26 will force fluid under pressure through the duct 78 to the engine 27 and cause this engine 27 to act as a fluid operated motor to drive the ring gear 17 in a direction opposite from the rotation of the shaft 14, thereby increasing the driving ratio of the transmission 13 to compensate for the reduction in the speed of the engine shaft 14.

Again assuming that the system is operating with the parts disposed as shown in the drawing, should there be an increase in engine speed, the increased flow of air produced by the supercharger 12 will increase the differential acting between the chambers 54 and 51, moving the diaphragm 52 rightwardly and carrying the valve part 57 rightwardly so as to increase the escape of fluid from the duct 56, thereby reducing the pressure in the cylinder 65 and permitting rightward movement of the piston 66 and of the lever 39. This rightward movement of the lever 39 toward the position 39a thereof will tilt the plate 35 in a direction to cause the hydraulic engine 26 to act as a fluid driven motor. That is to say, fluid will pass from the duct 78 under pressure from the hydraulic engine 27, which is now acting as a pump, through the hydraulic engine 26 into the duct 79 which returns the fluid to the engine 27. The hydraulic engine 26, accordingly, will be now driven by fluid received through the duct 78 from the hydraulic engine 27; the ring gear 17 will be permitted to rotate in the same direction as the shaft 14, under control of the engine 27, and the power generated by the hydraulic engine 26, acting now as a fluid operated motor, will be returned to the engine shaft 14 through the gears 24 and 23. Rotation of the ring gear 17 in the same direction as the shaft 14 results in a reduction in the drive ratio of the transmission 13 and accordingly a reduction in the speed of the shaft 15.

A further important feature of the invention is the provision of means for automatically adjusting the variable speed transmission into low ratio when the engine 26 is stopped, thereby minimizing danger of damage which might result in starting a device of this general character at high speed when all of the parts thereof are cold, as is generally the condition when the aircraft has been inactive for a period of time. The clearance between the outer surface of the piston 66 and the inner cylindrical surface of the cylinder 65 is slightly greater than the accepted standard clearance between similar sliding surfaces. Therefore, when the engine is stopped, the fluid in the rightward end of the cylinder 65 will leak past the piston 66 and flow by gravity through the bleed line 77 to the gear case of the transmission 13, thereby permitting the spring 68 to act against the piston 66 to move the control lever 39 into its extreme rightward position, shown by dotted lines 39a, thereby adjusting the variable speed transmission 13 to its lowest drive ratio so that upon the starting of the engine 26, the shaft 15 and the impeller of the supercharger 12 will be driven at slow speed. In this way, burning out of the bearings of the supercharger 12 is avoided. Owing to the fact that a reduction in pressure in the duct 56 results in a decrease in the driving ratio of the variable speed transmission 13, the opening of the valve 70 by the centrifugal governor 72 when a maximum speed of the shaft 15 is reached, prevents excess speed of the shaft 15 and of the supercharger impeller which it drives. In an emergency, such, for example, as a need for the immediate reduction in cabin pressure, the auxiliary valve 73 may be actuated by energizing the solenoid 75 to bleed off the pressure from the duct 56 and thereby cause a reduction in the drive ratio of the variable speed transmission 13 to its lowest value. Another emergency under which the auxiliary valve 73 might be utilized is where all of the available power of the engine is required for the operation of the propeller 11.

In Fig. 2 I have shown a portion of Fig. 1 embracing the means for operating the piston 66 and showing my alternative means for accomplishing over speed and manual control of the device. In this view I have shown parts previously identified with relation to the description of Fig. 1, and therefore have indicated these parts by the same numerals as previously employed. In Fig. 2 the valves 71' and 73', operable to connect the pressure line 56 to the return line 62, are avoided. In substitution therefor, a duct 56' is extended from the duct 50 which connects the Venturi throat 49 with the chamber 51 of the means 46 responsive to air in the path of airflow which includes the supercharger 12. This duct 56 leads to valves 71' and 73' which are closed during normal operation of the device. When the centrifugal governor 72 acts in response to over speed of the shaft 15 to open the valve 71', air will be permitted to escape from the duct 56', thereby reducing the pressure in the chamber 51 so that the valve 57 will be moved rightward so as to permit an increase in the rate of escape of hydraulic fluid from the duct 56.

The accompanying reduction in pressure in the chamber 65 will permit rightward movement of the piston 66 so that the lever 39 will swing toward or into the position 39a, Fig. 1. This adjustment of the lever 39a will cause the hydraulic device 26 to act as an engine operated by fluid pressure from the device 27 and accomplishing a reduction in the speed of the shaft 15. Also, the opening of the valve 73' by energization of the solenoid 75' will reduce the pressure in the chamber 51 and cause a reduction in the speed at which the shaft 15 is driven.

I claim as my invention:

1. In a system for moving a controlled flow of air into a compartment of an aircraft, the combination of: means establishing a path of flow of air which is to be delivered into said compartment; air pumping means in said path of flow for moving said air therethrough; a driven gear means connected to said pumping means to drive the same; first and second gear means for differentially driving said driven gear means; a power input shaft; drive connections between said shaft and said first and second gear means, at least one of said drive connections comprising a pair of hydraulic engines, at least one of which is of variable capacity, said engines being arranged so that one of them acts as a pump and the other acts as a fluid driven motor; control means responsive to change in fluid pressure for varying the capacity of said variable capacity engine; duct means for applying variable fluid pressure to said control means to cause it to control relative rotations of said first and second gear means to drive said driven gear means at a rate to maintain the flow of air through said path within a desired range; a valve for varying the pressure of said fluid in said duct means; and means responsive to pressure of said air for operating said valve.

2. In a system for moving a controlled flow of air into a compartment of an aircraft, the combination of: means establishing a path of flow of air which is to be delivered into said compartment; air pumping means in said path of flow for moving said air therethrough; a driven gear means connected to said pumping means to drive the same; first and second gear means for differentially driving said driven gear means; a power input shaft; drive connections between said shaft and said first and second gear means; means acting when said shaft is not driving said drive connections for relatively adjusting them for slow speed driving of said pumping means; and means responsive to pressure of said air for controlling at least one of said drive connections to accomplish relative rotations of said first and second gear means which will drive said driven gear means at a rate to maintain the flow of air through said path within a desired range.

3. In a system for moving a controlled flow of air into a compartment of an aircraft, the combination of: means establishing a path of flow of air which is to be delivered into said compartment; air pumping means in said path of flow for moving said air therethrough; a driven gear means connected to said pumping means to drive the same; first and second gear means for differentially driving said driven gear means; a power input shaft; drive connections between said shaft and said first and second gear means, at least one of said drive connections comprising a pair of hydraulic engines, at least one of which is of variable capacity, said engines being arranged so that one of them acts as a pump and the other acts as a fluid driven motor; means acting when said power input shaft is not driving said drive connections for adjusting said variable capacity engine for slow speed driving of said pumping means; means responsive to air in said path of flow for varying the capacity of said variable capacity engine whereby relative rotations of said first and second gear means will drive said driven gear means at a rate to maintain the flow of air through said path within a desired range; and auxiliary means for adjusting said variable capacity engine for slow speed driving of said pumping means.

4. In a system for moving a controlled flow of air into a compartment of an aircraft, the combination of: means establishing a path of flow of air which is to be delivered into said compartment; air pumping means in said path of flow for moving said air therethrough; a driven gear means connected to said pumping means to drive the same; first and second gear means for differentially driving said driven gear means; a power input shaft; drive connections between said shaft and said first and second gear means; means responsive to air in said path of flow for controlling at least one of said drive connections whereby relative rotations of said first and second gear means will drive said driven gear means at a rate to maintain the flow of air through said path within a desired range; and auxiliary means for adjusting at least one of said drive connections for slow speed driving of said pumping means.

5. In a system for moving a controlled flow of air into a compartment of an aircraft, the combination of: means establishing a path of flow of air which is to be fed into said compartment; air pumping means in said path of flow for moving said air therethrough; a driven gear means connected to said pumping means to drive the same; first and second gear means for differentially driving said driven gear means; a power input shaft; a first drive connection from said shaft to said first gear means to apply power to rotate the same; a second drive connection from said shaft to said second gear means to apply power to rotate the same, at least one of said drive connections being variable in speed; means responsive to air in said path of flow for controlling at least one of said drive connections whereby relative rotations of said first and second gear means will drive said driven gear means at a rate to maintain the flow of air through said path within a desired range; and a second control means operative independently of said air to control at least one of said drive connections.

6. In a system for moving a controlled flow of air into a compartment of an aircraft, the combination of: means establishing a path of flow of air which is to be fed into said compartment; air pumping means in said path of flow for moving said air therethrough; a driven gear means connected to said pumping means to drive the same; first and second gear means for differentially driving said driven gear means; a power input shaft; drive connections transmitting power from said shaft to said first and second gear means at least one of said drive connections comprising an hydraulic engine device driven by said shaft and an hydraulic pumping device driven by fluid from said engine device and delivering power to one of said gear means, at least one of said hydraulic devices being of variable capacity; control means responsive to changes in degree of fluid pressure to vary the capacity of said last named hydraulic device; and means responsive variations in pressure in said air operating to supply variable fluid pressure to said control means to actuate the same and regulate the correlated action of said first and second gear means so as to drive said air pumping means at a speed to maintain the flow of air through said path within a desired range.

7. In a system for moving a controlled flow of air into a compartment of an aircraft, the combination of: means establishing a path of flow of air which is to be delivered into said compartment; air pumping means in said path of flow for moving said air therethrough; a driven gear means connected to said pumping means to drive the same; first and second gear means for differentially driving said driven gear means; a power input shaft; drive connections between said shaft and said first and second gear means; fluid operated means for controlling at least one of said drive connections comprising a source of fluid under pressure; duct means connecting said source to said fluid operated means; first means responsive to changes in pressure in said air, said last named means varying the pressure of said fluid under pressure delivered through said duct means to said fluid operated means; and a second means operative to vary the pressure of said fluid under pressure independently of changes in pressure in said air.

8. In a system for moving a controlled flow of air into a compartment of an aircraft, the combination of: means establishing a path of flow of air which is to be delivered into said compartment; air pumping means in said path of flow for moving said air therethrough; a driven gear means connected to said pumping means to drive the same; first and second gear means for differentially driving said driven gear means; a power input shaft; drive connections between said shaft and said first and second gear means; fluid operated means for controlling at least one of said drive connections comprising a source of fluid under pressure; duct means connecting said source to said fluid operated means; control means responsive to changes in pressure in said air, said last named means having a valve bleeding fluid from said duct means and varying the pressure of said fluid under pressure delivered through said duct means to said fluid operated means; and a second valve operative independently of said control means to bleed fluid from said duct means.

9. In a system for moving a controlled flow of air into a compartment of an aircraft, the combination of: means establishing a path of flow of air which is to be fed into said compartment; air pumping means in said path of flow for moving said air therethrough; a differential drive comprising a driven gear means and first and second differential gear means operatively related to said driven gear means, said driven gear means being connected to pumping means to drive same; a power input shaft; a drive connection from said shaft to said first gear means to apply power to drive the same; and means for controlling the rotation of said second gear means, comprising a control means responsive to air in said path of flow and controlling the speed of said second gear means and thereby producing rotation of said driven gear means at a rate to maintain the flow of air through said path of flow within a given range, and a second control means operative independently of said air to control the rotation of said second gear means.

10. In a system for moving a controlled flow of air into a compartment of an aircraft, the combination of: means establishing a path of flow of air which is to be fed into said compartment; air pumping means in said path of flow for moving said air therethrough; a differential drive comprising a driven gear means and first and second differential gear means operatively related to said driven gear means, said driven gear means being connected to pumping means to drive same; a power input shaft; a drive connection from said shaft to said first gear means to apply power to drive the same; and means for controlling the rotation of said second gear means, comprising a control means responsive to air in said path of flow and controlling the speed of said second gear means and thereby producing rotation of said driven gear means at a rate to maintain the flow of air through said path of flow within a given range, and a second control means operative independently of said air to control the rotation of said second gear means, and a third control means operating prior to the driving of said driven gear means to control the rotation of said second gear means so that the initial driving of said driven gear means will be at slow speed.

11. In a system for moving a controlled flow of air into a compartment of an aircraft, the combination of: means establishing a path of flow of air which is to be fed into said compartment; air pumping means in said path of flow for moving said air therethrough; a differential drive comprising a driven gear means and first and second differential gear means operatively related to said driven gear means, said driven gear means being connected to pumping means to drive same; a power input shaft; a drive connection from said shaft to said first gear means to apply power to drive the same; and means for controlling the rotation of said second gear means, comprising a control means responsive to air in said path of flow and controlling the speed of said second gear means and thereby producing rotation of said driven gear means at a rate to maintain the flow of air through said path of flow within a given range, and a second control means operating prior to the driving of said driven gear means to control the rotation of said second gear means so that the initial driving of said driven gear means will be at slow speed.

12. In a system for moving a controlled flow of air into a compartment of an aircraft, the combination of: means establishing a path of flow of air which is to be fed into said compartment; air pumping means in said path of flow for moving said air therethrough; a differential drive comprising a driven gear means and first and second differential gear means operatively related to said driven gear means, said driven gear means being connected to pumping means to drive same; a power input shaft; a drive connection from said shaft to said first gear means to apply power to drive the same; fluid pressure actuating means for controlling the rotation of said second gear means; a valve for controlling fluid pressure in said control means; adjusting means responsive to changes in pressure in said air to regulate said valve; and adjusting means operative independently of said pressure in said air to control said fluid pressure.

13. In a system for moving a controlled flow of air into a compartment of an aircraft, the combination of: means establishing a path of flow of air which is to be fed into said compartment; air pumping means in said path of flow for moving said air therethrough; a differential drive comprising a driven gear means and first and second differential gear means operatively related to said driven gear means, said driven gear means being connected to pumping means to drive same; a power input shaft; a drive connection from said shaft to said first gear means to apply power to drive the same; fluid pressure actuating means for controlling the rotation of said second gear means; a valve for controlling fluid pressure in said control means; adjusting means responsive to changes in pressure in said air to regulate said valve; adjusting means operative independently of said pressure in said air to control said fluid pressure; and a third adjusting means, operating prior to the driving of said driven gear means to control said fluid pressure so that the initial driving of said driven gear means will be at slow speed.

14. In a system for moving a controlled flow of air into a compartment of an aircraft, the combination of: means establishing a path of flow of air which is to be fed into said compartment; air pumping means in said path of flow for moving said air therethrough; a differential drive comprising a driven gear means and first and second differential gear means operatively related to said driven gear means, said driven gear means being connected to pumping means to drive same; a power input shaft; a drive connection from said shaft to said first gear means to apply power to drive the same; fluid pressure actuating means for controlling the rotation of said second gear means; a valve for controlling fluid pressure in said control means; adjusting means responsive to changes in pressure in said air to regulate said valve; and adjusting means, operating prior to the driving of said driven gear means to control said fluid pressure so that the initial driving of said driven gear means will be at slow speed.

HOMER J. WOOD.

REFERENCES CITED

The following references are of record in the file of this patent:

UNITED STATES PATENTS

| Number | Name | Date |
|---|---|---|
| 1,077,454 | Cooke | Nov. 4, 1913 |
| 1,197,789 | Bluemel | Sept. 12, 1916 |
| 1,655,683 | Standerwick | Jan. 10, 1928 |
| 2,377,199 | Adams et al. | May 29, 1945 |
| 2,390,240 | DeLancey | Dec. 4, 1945 |
| 2,403,381 | Lawrence | July 2, 1946 |
| 2,440,614 | Postel | Apr. 27, 1948 |